(12) United States Patent
Morissette

(10) Patent No.: US 9,694,816 B2
(45) Date of Patent: Jul. 4, 2017

(54) VEHICLE MANAGEMENT SYSTEM

(71) Applicant: Jean Morissette, Montreal (CA)

(72) Inventor: Jean Morissette, Montreal (CA)

(73) Assignee: Chantal Farah, Anjou, Quebec (CA)

( * ) Notice: Subject to any disclaimer, the term of this patent is extended or adjusted under 35 U.S.C. 154(b) by 0 days.

(21) Appl. No.: 14/918,220

(22) Filed: Oct. 20, 2015

(65) Prior Publication Data
US 2017/0106863 A1 Apr. 20, 2017

(51) Int. Cl.
*B60T 8/32* (2006.01)
*G05B 19/00* (2006.01)
*B60D 1/28* (2006.01)
*B60W 30/14* (2006.01)
*G01S 19/13* (2010.01)
*B60Q 9/00* (2006.01)

(52) U.S. Cl.
CPC ............. *B60W 30/146* (2013.01); *B60Q 9/00* (2013.01); *G01S 19/13* (2013.01)

(58) Field of Classification Search
USPC .......................... 701/93; 340/5.31; 180/271
See application file for complete search history.

(56) References Cited

U.S. PATENT DOCUMENTS

| | | | | |
|---|---|---|---|---|
| 5,090,514 | A * | 2/1992 | Wright | B60K 28/06 180/271 |
| 9,272,713 | B1 * | 3/2016 | Dvoskin | B60W 40/08 |
| 2005/0200204 | A1 * | 9/2005 | Jonsson | B63C 9/0011 307/10.3 |
| 2006/0052909 | A1 * | 3/2006 | Cherouny | B60K 28/063 701/1 |
| 2007/0200663 | A1 * | 8/2007 | White | A61B 5/117 340/5.31 |
| 2007/0239992 | A1 * | 10/2007 | White | B60K 28/063 713/186 |
| 2014/0115693 | A1 * | 4/2014 | Schieman | G06F 21/53 726/17 |
| 2014/0152422 | A1 * | 6/2014 | Breed | G06K 9/00369 340/5.52 |
| 2014/0310788 | A1 * | 10/2014 | Ricci | B60Q 1/00 726/6 |

* cited by examiner

*Primary Examiner* — Tyler Paige
(74) *Attorney, Agent, or Firm* — Brouillette Legal Inc.; Robert Brouillette

(57) ABSTRACT

A passenger actionable emergency vehicle management system for altering the behavior of the vehicle is disclosed. The vehicle management system comprises a vehicle overriding mechanism operatively connected to the vehicle and capable of overriding driver controlled vehicle systems, a control circuit operatively connected to the vehicle overriding mechanism and an actuator, operatively connected to the control circuit and located in the vehicle within reach of a vehicle passenger seat.

19 Claims, 3 Drawing Sheets

VEHICLE MANAGEMENT SYSTEM

CROSS-REFERENCE TO RELATED APPLICATIONS

There are no cross-related applications.

FIELD OF THE INVENTION

The present invention belongs to the field of devices and systems that aid in stopping a vehicle, more specifically managing the behavior of the vehicle in case of emergencies or hazardous driving conditions.

BACKGROUND OF THE INVENTION

More and more vehicle accidents involve youths and/or impaired drivers driving over the speed limit or in a reckless manner. In many of these accidents, there are passengers who are helpless and at the mercy of the driver. The passengers could use their mobile phone to contact help but most often are unable to do so in the moment under the emotions and are left without any means to resolve a potentially hazardous situation. There is thus a need for a vehicle management system capable of giving the passenger some power in controlling the behavior of the vehicle in such hazardous conditions.

As a preliminary note, it should be stated that there is an ample amount of prior art that deals with emergency stop systems for a vehicle. Some of them will be discussed herein below.

The Hildebrecht Patent (U.S. Pat. No. 4,295,540) discloses a vehicle brake and engine interlock system, wherein when the parking brake is activated, the system overrides the operator's control to limit fuel input to the engine.

The Talkes Patent (U.S. Pat. No. 1,854,868) discloses a device for automatically stopping the motor of an automobile. However, this device works with the ignition switch to turn on/off the engine as opposed to turning on/off the fuel pump, which essentially starves the engine of fuel.

The Lineberger Patent (U.S. Pat. No. 5,219,413) discloses an engine idle shift-down controller for a vehicle that includes a parking brake activated switch. However, the switch does not open a circuit that stops electrical current from entering the fuel pump of an engine, and ultimately stalling the engine.

The Mann et al. Patent (U.S. Pat. No. 4,691,801) discloses an anti-theft system for vehicles that interrupt the fuel supply when activating the vehicle's parking brake system.

The Ueda et al. Patent (U.S. Pat. No. 4,414,937) discloses an automatic engine stop and start apparatus. The apparatus requires a plurality of inputs to appear before issuing an alarm, and does not simply stop the electrical current to a fuel pump.

While the above-described devices fulfill their respective and particular objects and requirements, they do not describe a system for stopping a vehicle in case of emergency or hazardous solution that is controlled by the passenger, nor do they describe a vehicle management system for altering the vehicle behavior in case of an hazardous condition.

Accordingly, there is a need for a system that provides passengers of a vehicle with the ability to act to mitigate the hazardous conditions in which they are in.

SUMMARY

The shortcomings of the prior art are generally mitigated by providing a vehicle management system that gives a vehicle passengers some control on the vehicle behavior in cases of hazardous or reckless driving.

It is an aim of the present disclosure to provide a passenger actionable emergency vehicle management system for altering the behavior of the vehicle, the system comprising a vehicle overriding mechanism operatively connected to the vehicle and capable of overriding driver controlled vehicle systems, a control circuit operatively connected to the vehicle control mechanism and an actuator, operatively connected to the control circuit and located within reach of the vehicle passenger seat.

It is an aim of the present invention to provide a vehicle management system for altering a behavior of a vehicle by a passenger in case of emergency, the system comprises a vehicle overriding mechanism operatively connected to the vehicle for overriding at least one driver controlled vehicle systems; an actuator, operatively connected to the vehicle overriding mechanism and located in the vehicle within reach of a vehicle passenger seat and a communication interface to wirelessly receive data from a computing device or a user and to wirelessly transfer an alert signal to a remote service, the vehicle management system being initially inoperative and the activation of the actuator, upon occurrence of an hazardous condition or reckless driving, initiates the activation of the vehicle overriding mechanism.

It is a further aim of the present disclosure to provide a vehicle management system with a disabling mechanism having operative and inoperative modes, in the operative mode, the disabling mechanism may disable the vehicle power in response to a trigger signal resulting in stopping the vehicle, in the inactive mode, the disabling mechanism is unable to affect the vehicle systems.

In accordance with the teachings of the disclosure, there is disclosed a vehicle management system comprising a communication interface to wirelessly transfer and/or receive data to/from a computing device.

It is a further aim of the present disclosure to provide a vehicle management system wherein the computing device is a remote database capable of receiving vehicle behavior data for collection. As such, the collected data may be reviewed by the owner, the manufacturer, an assurer or law enforcement authorities.

It is a further aim of the present disclosure to provide a vehicle management system having a computing device with a speed limit/GPS coordinates database or capable of accessing such a database.

It is a further aim of the present disclosure to provide vehicle management system having a vehicle overriding mechanism operatively connected to a GPS module for informing the vehicle overriding mechanism of the vehicle positioning and associating the GPS coordinates from the GPS module with a corresponding speed limit entry from the speed limit/GPS coordinates database.

It is a further aim of the present disclosure to provide vehicle management system in which actuating the actuator triggers the control circuit thus enabling the vehicle overriding mechanism. As such, the enabled vehicle overriding mechanism may limit the speed of the vehicle to the speed limit corresponding to the GPS coordinate of the GPS vehicle module, or when required/suitable to the situation, stop the vehicle.

It is a further aim of the present disclosure to provide a vehicle management system wherein actuating the actuator triggers the control circuit which then enable the vehicle overriding mechanism, and wherein the enabled vehicle overriding mechanism generate an alarm signal. In addition, the generated alarm may be sent to remote services such as car monitoring services, law enforcement, emergency services, etc. The alarm signal may be silent, thus imperceptible by the driver but communicated to a third party such as remote services or vehicle owner. According to one embodiment, the alarm signal may be a repeated klaxon noise or a loud vehicle alarm system similar to an alarm that is triggered from failure to comply with in vehicle breathalyzer.

It is a further aim of the present disclosure to provide a vehicle management system configured to communicate an alarm signal to a vehicle owner through wireless communications such as SMS. Likewise, the alarm signal may be communicated through manufacturer installed communication systems or through a passenger smartphone connection.

In accordance with the teachings of the disclosure, there is disclosed a vehicle management system wherein the vehicle overriding mechanism communicates an alarm signal when the vehicle exceeds the speed limit associated with the GPS coordinate. Similarly, there is disclosed a vehicle management system wherein a vehicle overriding mechanism communicates vehicle GPS coordinates to emergency services through wireless communications and wherein the system actuator may be controlled by a mobile device application.

In accordance with the teachings of the disclosure, there is disclosed a vehicle management system capable of being controlled by a mobile phone application using various near communication such as near field communication (NFC) or Bluetooth™ to interact with the vehicle management system. Consequently, according to an embodiment of the vehicle management, there is disclosed a system that may be preinstalled on a vehicle but whereas a user has to purchase a software such as an application, web service or subscription service for enabling the vehicle management system within a vehicle. Furthermore, there is disclosed a system wherein the payment of the vehicle management system may be through remote wireless device such as mobile phone or tablet interfaces and/or applications installed thereto.

According to an embodiment, the vehicle management system may be built-in from the various vehicle or be installed by a user/owner/service provider as an add-on basis.

It is a further aim of the present disclosure to provide a method of action for passengers onboard a vehicle wherein the driver controlled vehicle behave hazardously. Therefore, the method comprises the step of actuating an emergency vehicle management system for altering the behavior of the vehicle, the actuation of a vehicle actuator and thus triggering a response from the vehicle. According to one embodiment, the vehicle response may be reduction of the vehicle speed to the maximum limit authorized for the road according to the vehicle GPS coordinates.

It is an aim of the present invention to provide a method for overriding a driver vehicle control upon occurrence of an hazardous condition or reckless driving. The method comprises the following steps:
  a) actuating an actuator located in the vehicle within reach of a vehicle passenger seat and operatively connected to a vehicle overriding mechanism;
  b) actuating the vehicle overriding mechanism;
  c) inhibiting a vehicle control system affecting the behavior of the vehicle; and
  d) actuating a communication interface to wirelessly receive data from a computing device or a user and to wirelessly transfer an alert signal to a remote service.

These together with additional objects, features and advantages of the automobile emergency stop system will be readily apparent to those of ordinary skill in the art upon reading the following detailed description of presently preferred, but nonetheless illustrative, embodiments of the automobile emergency stop system when taken in conjunction with the accompanying drawings.

In this respect, before explaining the current embodiments of the automobile emergency stop system in detail, it is to be understood that the automobile emergency stop system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automobile emergency stop system.

It is therefore important that the claims be regarded as including such equivalent construction insofar as they do not depart from the spirit and scope of the automobile emergency stop system. It is also to be understood that the phraseology and terminology employed herein are for purposes of description and should not be regarded as limiting.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel Vehicle Management System will be described hereinafter. Although the invention is described in terms of specific illustrative embodiments, it is to be understood that the embodiments described herein are by way of example only and that the scope of the invention is not intended to be limited thereby.

Generally stated, the non-limitative illustrative embodiment of the present invention provides vehicle management system for the emergency immobilization of a vehicle in cases where a passenger fears its life may be in danger because of the actions of the driver of the vehicle.

Figure 1:
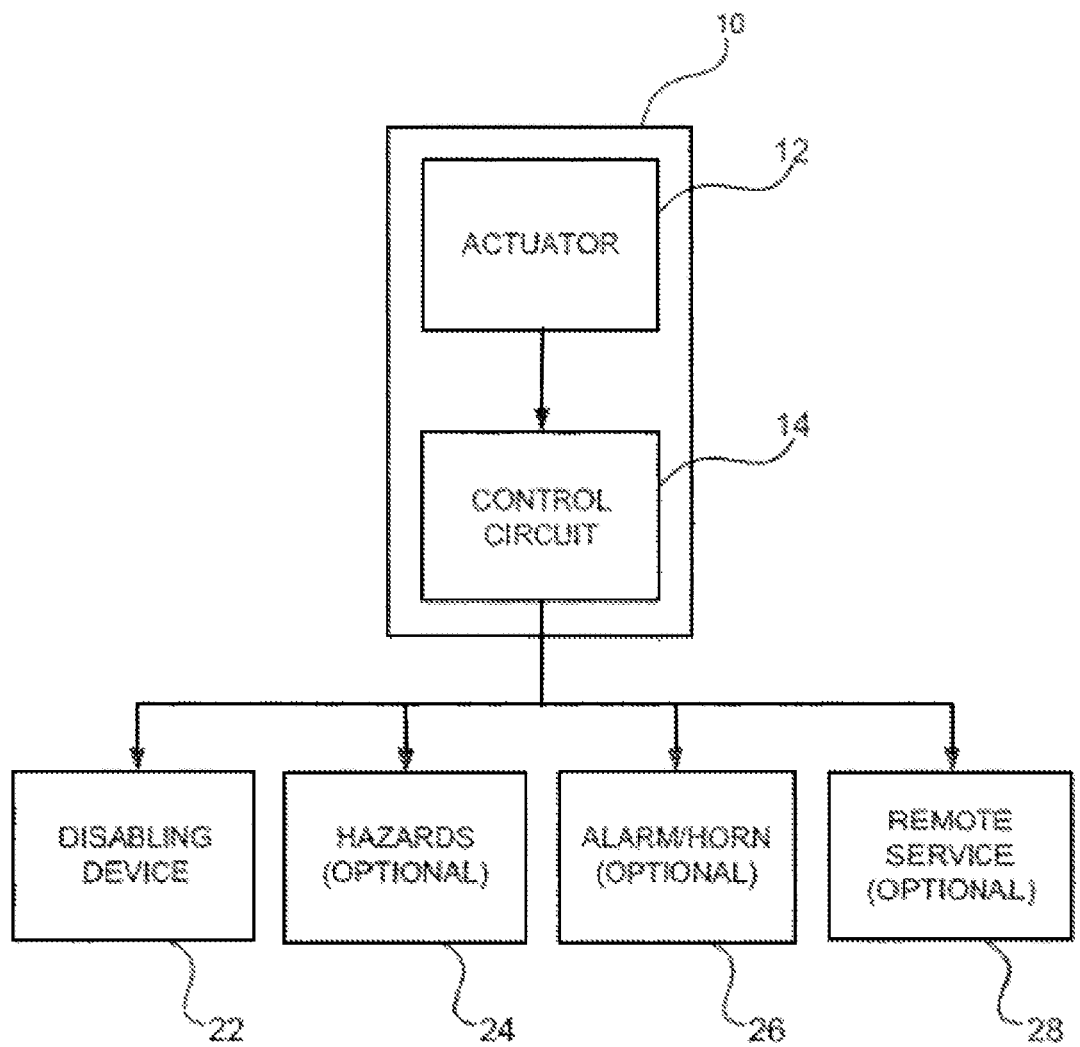
FIG. 1 is block diagram of an illustrative embodiment of the emergency immobilization system.

Referring to FIG. 1, according to one embodiment, the emergency immobilization system 10 comprises an actuator 12 and a control circuit 14. The control circuit 14 may interact with a disabling mechanism 22, and, optionally, with other components such as hazard lights 24, the alarm system and/or horn 26 and a remote service 28 such as, for example, the OnStar® service.

The actuator 12 may take the form of a button, switch or other such mechanism that may be activated by a passenger of a vehicle. In an alternative embodiment, the actuator may be a voice recognition system which can recognize commands to stop the vehicle or the shouting/cries of a person.

Figure 2:
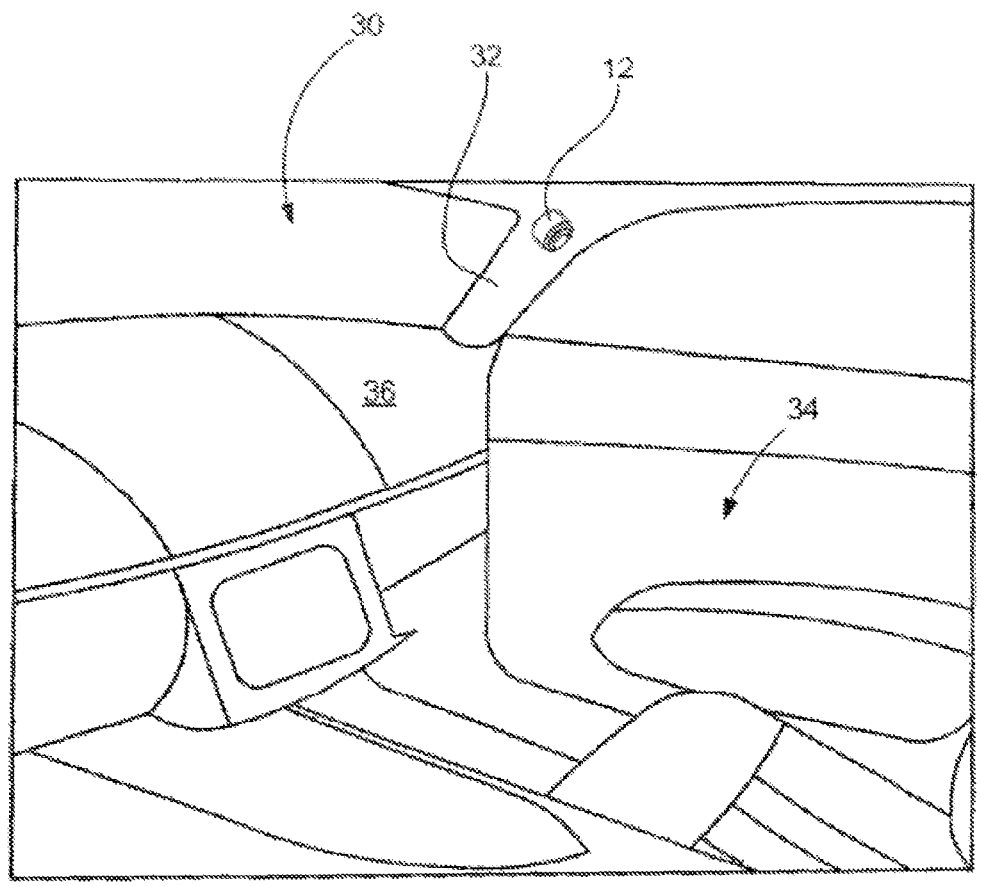
FIG. 2 is a perspective view of the actuator of FIG. 1 positioned in the interior of a vehicle.
Figure 3A:
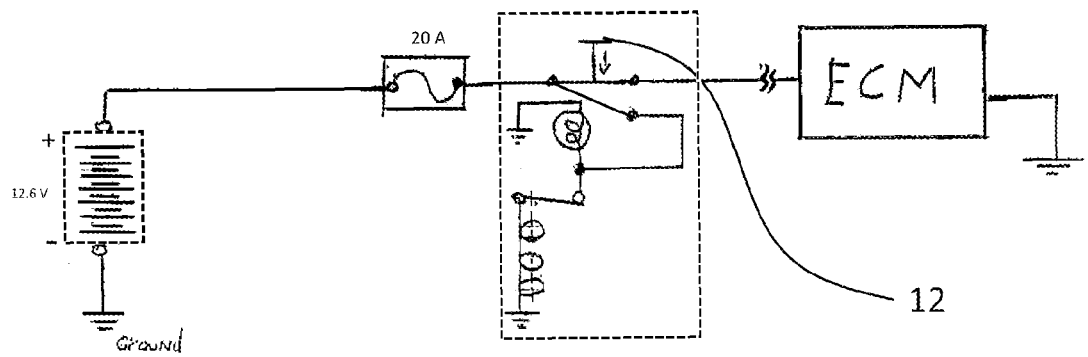
FIG. 3a-d are exemplary electronic circuits that could be incorporated to the vehicle as part of the vehicle management system.
Figure 3B:
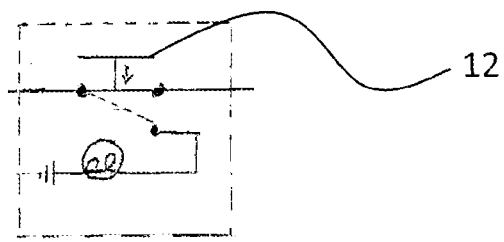
Figure 3C:
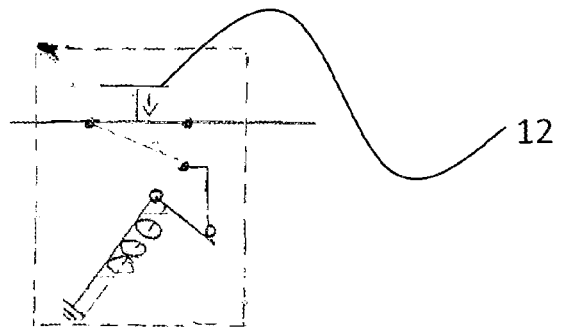
Figure 3D:
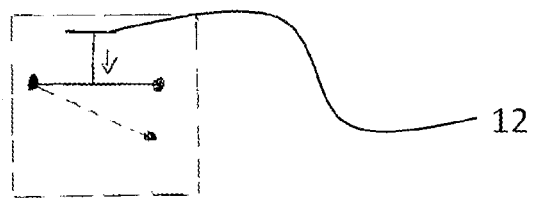

Referring to FIGS. 2 and 3, according to embodiments, the actuator 12 may be positioned on the inside of a vehicle 30, for example, on a pillar 32 on the front passenger side 34. Further actuators may be provided on other pillars (not shown) of the vehicle in order to provide access to passengers in the rear seats. In alternative embodiments, the actuator 12 may be positioned on the dashboard 36, the headrest of the driver and/or front passenger (not shown) for the rear seat passenger(s) to use, the ceiling (not shown), etc. Any convenient location may be used, preferably a location that is not subject to accidental actuation. In a further alternative embodiment, the actuator 12 may be provided with a security feature in order to diminish the risks of an accidental activation of the emergency immobilization system 10. For instance, a cover of the actuator may be hingely connected adjacent to the actuator. The passenger will have to open the cover before being able to activate the actuator. Triggering of the actuator 12 by the passengers, according to an embodiment, interrupts a vehicle control circuit thus effectively preventing electric signal from the circuit to travel therethrough and overrides the driver control on a desired vehicle system. According to embodiments, the vehicle management may comprise a control switch designed for multiple utilisations or for a single use (FIG. 3d).

Now referring to FIG. 3, according to embodiments, the control circuit 14, when activated by the actuator 12, changes the state of the disabling mechanism 22 which then disables the vehicle by inhibiting the vehicle's ignition or engine management system. In an alternative embodiment, the disabling mechanism 22 may optionally limit the speed of the vehicle. In a further alternative embodiment, the speed limit may be set according to the speed limit of the road the vehicle is traveling on. This may be achieved by using a GPS module (not shown) and a reference table of speed limits associated with roads identified by the GPS module.

Optionally, as previously mentioned, the control circuit 14 may also be operatively connected to one or more additional components such as hazard lights 24, the alarm system and/or horn 26 and a remote service 28 such as, for example, the OnStar® service. Accordingly, when the control circuit 14 is activated by the actuator 12, it may light the hazards and/or the alarm/horn in order to warn other drivers that the vehicle represents a danger and that it will be slowing down. Optionally still, the control circuit 14 may initiate communication with a remote service 28 such as the OnStar® service to warn the authorities of a possible emergency situation and request assistance, either automatically or by establishing a hands-free communication with an operator.

It is to be understood that the emergency immobilization system 10 may be an option on a new vehicle or fitted to an existing vehicle as an accessory.

The present vehicle management system/emergency immobilization system, according to embodiments, may be configured to override driver controlled vehicle systems such as vehicle acceleration and vehicle door locking systems. The present vehicle management system may thus assist the driver to mitigate problems arising from hazardous or reckless driving conditions. Therefore, the vehicle management system may acquire GPS coordinates and communicate with a local or remote server to obtain information about authorized speed limit and as a result, upon enabling of the system, limit the vehicle speed to the maximum authorized speed limit. Alternatively, the enabled vehicle management system may detect the location of the vehicle and assess the potential danger of disabling the vehicle power system. Accordingly, once the enabled vehicle management system detects a hazardous condition, such as speeding or passenger actuated alarm, the vehicle management system may upon assessing the danger zone of the vehicle, disable the vehicle ignition or shut down the vehicle. Understandably, shutting down the vehicle may not be desired on a highway therefore, a highway may be categorized as a danger zone where the vehicle management system would only limit the vehicle speed or gradually decrease the speed of the vehicle until a safe zone is detected, at which point the vehicle would motor could be turned off or the vehicle stopped by another suitable control system. A safe zone, where limited risk could entail from stopping (gradually or not) a vehicle may be a parking lot.

According to embodiments, the vehicle management system could be voluntary or mandated. The system could be voluntarily installed for instance to obtain a lower automobile insurance premium whereas the mandatory system may be installed following a court order resulting from repeated speeding offences. The vehicle management system may also be used as a monitoring system for young driver or new driver. As such, the system may be installed by a vehicle owner such as a parent, a vehicle manufacturer to increase security, a vehicle service provider to assess employee behaviors and ensure passenger safety. Furthermore, a vehicle management system may be installed on a vehicle by law enforcement for controlling at-risk drivers. The vehicle management system according to embodiments could be used in similar fashion or in combination with mandated breathalyzer following DUI (driving under the influence) charges. As such, the present system installation may be required to monitor repeated speeder or road infringer and used to limit the likelihood of speeding accidents.

According to some embodiments, the vehicle management system is configured to alter a specific vehicle parameter upon detection of a specific event or detection of manually actuated actuator. The vehicle management, when enabled, thus acts to disable a vehicle ignition or trigger an alarm signal.

According to one embodiment, the actuator may be triggered by a passenger or guest detecting that his friend or driver appears to be under the influence. In such a case, the actuated system may prevent vehicle ignition or require the potential driver to submit and succeed a breathalyzer test before igniting the vehicle.

According to another embodiment, the vehicle management system could be controlled by a mobile application utilized by a vehicle driver and available to the driver's friends and guests. The driver may indicate to the softward/application that he will be at some friends place through software collected data (i.e. from a web calendar, a social media event list or social media accounts). Upon activation of the abovementioned feature, the driver's friends, potential passengers or guest could obtain access to the vehicle management system emergency overriding controls. Therefore, a guest, a passenger or a friend through a mobile application or other remote wireless systems may upon detecting that the potential driver has consumed too much alcohol, enable the vehicle management system thus overriding the ignition or vehicle power system. As such, the vehicle would be prevented from starting until the driver has sufficiently confirmed that he is not under the influence or over the authorized blood alcohol limit, through a breathalyser of other suitable detectors. Understandably the present vehicle management system may, according to some embodiment, be enable or disabled beforehand to prevent disabling of the vehicle ignition system.

Driver controlled vehicle systems are systems that are used to control/operate the vehicle and which are controlled by the driver, such systems comprises ignition, gas pump (via the gas pedal), steering wheel, cruise control, and the like. Furthermore, driver controlled vehicle systems refer to vehicle systems which may affect the behavior of the vehicle and which could, if enabled, help a passenger in a hazardous solution to mitigate the potential danger facing the vehicle.

According to an exemplary embodiment of the present invention, the vehicle management system comprise an actuator, preferably seamlessly accessible to a vehicle passenger and vehicle overriding mechanism. The actuator is in connection with the vehicle control system to enable a vehicle brake and engine interlock system. Alternatively, when the parking brake is activated, the system overrides the operator's control to limit fuel input to the engine.

According to an exemplary embodiment of the present invention, the vehicle management system comprise an actuator, preferably seamlessly accessible to a vehicle passenger. The actuator according to this exemplary embodiment is connected to a device for automatically stopping the motor of an automobile. This device works with the ignition switch to turn on/off the engine as opposed to turning on/off the fuel pump, which essentially starves the engine of fuel.

According to an exemplary embodiment of the present invention, the vehicle management system comprise an actuator, preferably seamlessly accessible to a vehicle passenger. The actuator is connected to an engine idle shift-down controller for a vehicle that includes a parking brake activated switch.

According to an exemplary embodiment of the present invention, the vehicle management system comprise an actuator, preferably seamlessly accessible to a vehicle passenger. The actuator according to this exemplary embodiment is in connection to an automatic engine stop and start apparatus. The apparatus requires an input from the actuator to appear before issuing an alarm, or simply stop the electrical current to a fuel pump.

According to an embodiment, the vehicle management system is a method for overriding a driver vehicle control upon occurrence of an hazardous condition or reckless driving, the method comprising actuating an actuator located in the vehicle within reach of a vehicle passenger seat and operatively connected to a vehicle overriding mechanism the vehicle overriding mechanism inhibiting a vehicle control system affecting the behavior of the vehicle. According to one embodiment, the method may comprise the step of assessing the danger level associated with the vehicle GPS coordinate and select the inhibited vehicle control system according to the danger level associated with a vehicle localisation. The actuator may be actuated through a mobile application controlled by a vehicle passenger.

Although the present invention has been described by way of particular embodiments and examples thereof, it should be noted that it will be apparent to persons skilled in the art that modifications may be applied to the present particular embodiment without departing from the scope of the present invention.

The invention claimed is:

1. A vehicle management system for altering a behavior of a vehicle by a passenger in case of emergency, the system comprising:
   a vehicle overriding mechanism operatively connected to the vehicle for overriding at least one driver controlled vehicle systems;
   an actuator, operatively connected to the vehicle overriding mechanism and located in the vehicle within reach of a vehicle passenger seat; and
   a communication interface to wirelessly receive data from a computing device or a user and to wirelessly transfer an alert signal to a remote service;
   wherein the vehicle management system being initially inoperative and wherein the activation of the actuator, upon occurrence of an hazardous condition or reckless driving, initiates the activation of the vehicle overriding mechanism.

2. The vehicle management system of claim 1, wherein the vehicle overriding mechanism is a disabling mechanism having operative and inoperative modes, wherein in the operative mode, the disabling mechanism disable the vehicle power in response to a trigger signal resulting in stopping the vehicle, and in the inactive mode, the disabling mechanism is unable to affect the vehicle systems.

3. The vehicle management system of claim 1, wherein the computing device is a remote database capable of receiving vehicle behavior data for collection.

4. The vehicle management system of claim 1, wherein the computing device is a speed limit/GPS coordinates database.

5. The vehicle management system of claim 4, wherein the vehicle overriding mechanism is operatively connected to a GPS module informing the vehicle overriding mechanism of the vehicle positioning, wherein vehicle overriding mechanism associate GPS coordinates from the GPS module with a corresponding speed limit entry from the speed limit/GPS coordinates database.

6. The vehicle management system of claim 5, wherein the enabled vehicle overriding mechanism limits the speed of the vehicle to the speed limit corresponding to the GPS coordinate of the vehicle GPS module.

7. The vehicle management system of claim 1, wherein actuating the actuator affect a control circuit enabling the vehicle overriding mechanism, the actuator being a control switch which upon activation interrupts the control circuit and prevents driver inputs from reaching the at least one driver controlled vehicle systems.

8. The vehicle management system of claim 7, wherein the vehicle overriding mechanism communicates an alarm signal when the vehicle exceeds the speed limit associated with the GPS coordinates.

9. The vehicle management system of claim 7, wherein the vehicle overriding mechanism communicates vehicle GPS coordinates to emergency services through wireless communications.

10. The vehicle management system of claim 1, wherein actuating the actuator triggers a control circuit enabling the vehicle overriding mechanism, and wherein the enabled vehicle overriding mechanism generate an alarm signal.

11. The vehicle management system of claim 10, wherein the alarm signal is a repeated klaxon noise.

12. The vehicle management system of claim 10, wherein the alarm signal is communicated to the vehicle owner through wireless communications.

13. The vehicle management system of claim 10, wherein the alarm signal is communicated through manufacturer installed communication systems.

14. The vehicle management system of claim 10, wherein the alarm signal is communicated through a passenger smartphone connection.

15. The vehicle management system of claim 1, wherein the actuator is controlled by a mobile device application.

16. A method for overriding a driver vehicle control upon occurrence of an hazardous condition or reckless driving, the method comprising:
   a) actuating an actuator located in the vehicle within reach of a vehicle passenger seat and operatively connected to a vehicle overriding mechanism;
   b) actuating the vehicle overriding mechanism;
   c) inhibiting a vehicle control system affecting the behavior of the vehicle; and
   d) actuating a communication interface to wirelessly receive data from a computing device or a user and to wirelessly transfer an alert signal to a remote service.

17. The method of claim 16, the method further comprising the step of assessing the danger level associated with vehicle GPS coordinate.

18. The method of claim 17, therein the inhibited vehicle control system is selected according to the danger level associated with a vehicle localisation.

19. The method of claim 18, wherein the actuator is actuated through a mobile application controlled by a vehicle passenger.

\* \* \* \* \*